Feb. 18, 1969          S. B. DAWSON          3,427,929
VALVES FOR FLUID OPERATED MOTORS
Filed Jan. 30, 1967

United States Patent Office 3,427,929
Patented Feb. 18, 1969

3,427,929
VALVES FOR FLUID OPERATED MOTORS
Stuart Bruce Dawson, Tyseley, Birmingham, England,
assignor to Girling Limited
Filed Jan. 30, 1967, Ser. No. 612,583
U.S. Cl. 91—347
Int. Cl. F01l 31/04, 31/06, 29/10
3 Claims

ABSTRACT OF THE DISCLOSURE

The invention is an automatic valve for controlling the supply of fluid to a reciprocating motor, which may be a pressure or vacuum operated motor, single or double acting. The valve has a reciprocating valve member actuated by an actuating member (which is reciprocated by the motor) through the intermediary of a novel linkage and a coil spring. As the actuating member moves in one direction of movement of the actuating member. In the and then passes an over centre position. The spring is then released and tends to drive the valve member towards its opposite end position, in a direction opposite to the direction of movement of the actuating member. In the event that the released energy of the spring is insufficient to overcome the static friction to which the valve member is subject, the link engages a stop just before the end of the stroke of the actuating member, and the link is thereby caused to pivot so as positively to drive the valve member away from its instant position.

---

This invention relates to automatic control valves for fluid operated reciprocating motors.

One form of motor to which the invention is applicable is a vacuum operated pump for providing a continuous source of fluid under pressure for actuating the brakes of a motor vehicle. Such a motor typically comprises a spring loaded piston or diaphragm, one side of which is constantly at atmospheric pressure while the other is alternately placed in communication with a source of vacuum to cause the piston to reciprocate and to drive a fluid pressurising piston. The alternating connection between vacuum and atmosphere is provided by means of an automatic valve, and the object of the present invention is to provide a new and improved construction of valve for this purpose.

Known valves of this type tend to suffer from the disadvantages of relying on lost-motion connection in the valve operating gear, with the result that the valves are noisy in operation and are subject to excessive wear of the valve member or a part or parts associated with it due to intermittent engagement by a part of the actuating mechanism.

The present invention provides a valve intended to reduce these problems of excessive noise and wear.

In accordance with a feature of the present invention, there is provided an automatic valve for a fluid operated reciprocating motor, comprising a reciprocable actuating member, a reciprocable valve member, a link connecting the two said members, resilient means acting between the said members, the link being constructed and arranged to shorten and stress the resilient means in such a manner that in operation of the valve, with the valve member in one extreme position, movement of the actuating member in one direction first causes the resilient means to be stressed by shortening the link and then to be released to urge the valve member towards its opposite extreme position, these actions being repeated in the reverse directions on the return stroke of the actuating member.

Preferably stops are provided which engage the link towards each end of the stroke of the actuating member, causing the link to pivot and positively drive the valve member away from its current extreme position in the event that the resilient means is unable to overcome the static friction to which the valve member is subject.

Figure 1:
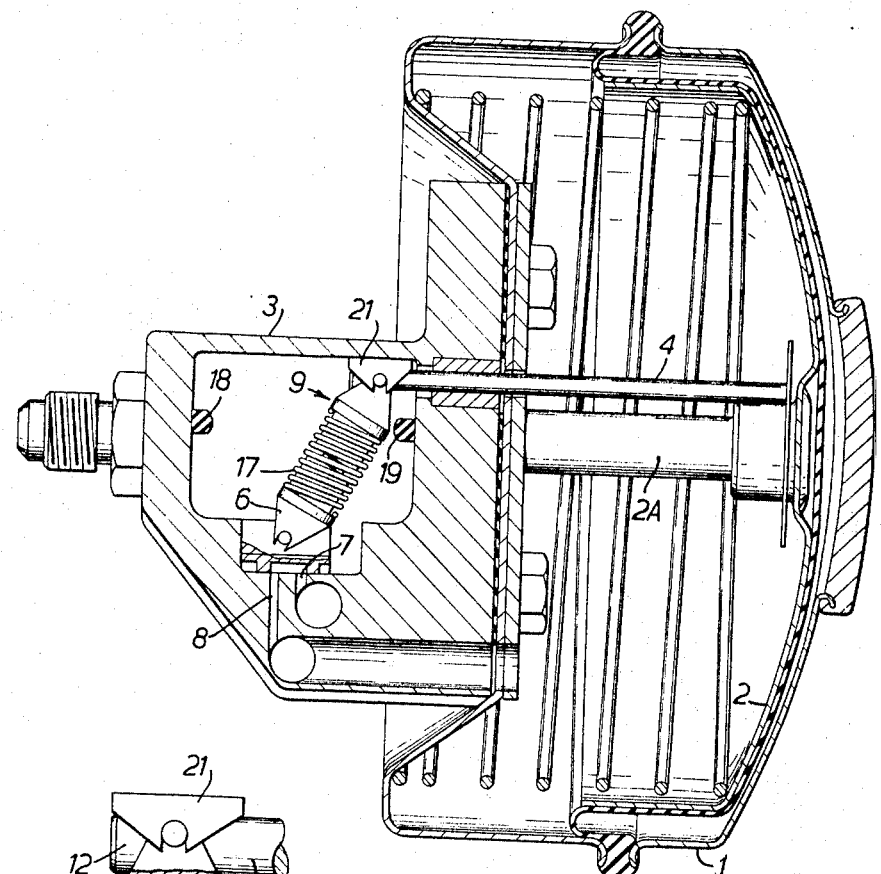
Figure 2:
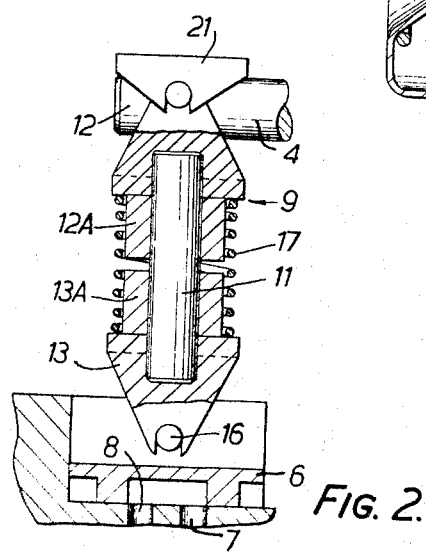

One form of valve in accordance with the invention will now be described by way of example only with reference to the accompanying drawings, in which:

FIGURE 1 is a sectional elevation of a side view, partly broken away, a fluid operated motor incorporating the valve; and FIGURE 2 is a scrap sectional view showing part of the valve mechanism.

The pump motor itself is of generally conventional construction, having a body 1 and diaphragm 2, one side of which is permanently connected to atmosphere while the other is alternatively connected to a source of vacuum (such as an engine manifold). A piston rod 2A connected to the diaphragm is coupled in use to a fluid pressurising piston (not shown) working in a pressure chamber. The valve mechanism controlling the alternating connection is located in a housing 3, and includes an actuating member 4 attached to the diaphragm 2 for reciprocation therewith.

The valve mechanism includes a valve member 6 which is reciprocable between one extreme position, as shown, in which it connects together a port 7 in communication with the source of vacuum and a port 8 communication with one side of the pump diaphragm, and an opposite extreme position in which it exposes the port 8 to atmospheric pressure within the valve housing.

As best shown in FIGURE 2, the actuating member 4 and valve member 6 are connected by a link 9 including a guide rod 11 on which are slidably mounted two end members 12 and 13 pivotally engaging respectively a sliding bearing member 21 on the actuating member 4, and a pin 16 on the valve member 6. Each end member is formed with a spigot 12A, 13A engaging a resilient means in the form of a coil compression spring 17, acting effectively between the actuating member and the valve member. Two adjustable rubber-headed stops 18 and 19 (FIGURE 1) are arranged to engage the link near the opposite ends of its travel.

In FIGURE 1, the actuating member is in its extreme right-hand position, and the valve member is in its extreme left-hand position.

In FIGURE 2, the actuating member 4 is shown in mid-stroke travelling from right to left. In the first part of this stroke, the link 9 has been shortened compressing the spring 17, and at the position shown the spring is at its central position in which its compressive stress is at a maximum value. A the actuating member moves the link past the central position, the energy of the spring is released and acts on the valve member in a sense to move it to the right. Initially the static friction to which the valve member is subjected will resist this movement, but as the actuating member continues its leftward movement, the horizontally resolved component of the spring force increases until it overcomes the static friction and moves the valve to its extreme right-hand position. The diaphragm return spring will then act to reverse the movement of the diaphragm and actuating member, and the foregoing actions will be repeated in the reverse direction.

Normally, the spring 17 will overcome static friction before the actuating member reaches the end of its stroke, but in the event that the static friction is too great for the spring to overcome, the link engages one or other of the stops 18, 19 just before the actuating member 4 reaches the end of its stroke, thereby causing the link to pivot about its connection to the actuating member and positively drive the valve member away from its instant extreme position.

The valve is thus positively prevented from stalling and thereby interrupting operation of the pump.

By virtue of the fact that the link is permanently connected to the actuating and valve members, the arrangement avoids the disadvantages of excessive noise and wear inherent in prior arrangements in which the valve member or a part associated with it is intermittently and repeatedly engaged by a portion of the actuating mechanism.

Many variations and modifications will of course be possible within the scope of the invention. The pump motor incorporating the valve could be vacuum or pressure operated, and either single acting with spring return (as shown) or double acting, and could be used for other purposes than providing fluid pressure for braking. It could, for example, provide pressure fluid for driving a windscreen wiper. A vacuum operated motor may be air-suspended (as described) or vacuum suspended.

I claim:

1. In an automatic control valve for controlling the supply of fluid to a fluid operated reciprocating motor, which valve comprises a valve member reciprocable between two operative end positions, and an actuating member reciprocable by said motor between two extreme positions beyond said respective end positions, a link having opposite end portions connected to said valve member and said actuating member, respectively, said end portions being movable towards and away from each other, and resilient means acting between said members, said resilient means being adapted, when said actuating member is in one extreme position, to urge said valve member towards its end position remote from said one extreme position, and movement of said actuating member towards its other said extreme position acting to shorten said link and strain said resilient means and then to cause said resilient means to act on said valve member in a sense to urge it to its opposite end position, the improvement which comprises stop means positioned to be engaged by said link towards each end of the stroke of said actuating member, whereby to cause said link to pivot and positively drive said valve member in the event of said valve member being frictionally held in one end position against the action of said resilient means.

2. Automatic control valve as claimed in claim 1 wherein said resilient means comprises a spring acting between said opposite end positions of said link.

3. The valve of claim 1 wherein said stop means comprises buffers of resilient material disposed in the path of movement of said link means.

References Cited

UNITED STATES PATENTS

| Re. 9,804 | 7/1881 | Mayhew | 91—347 |
| 1,395,604 | 11/1921 | Skinner | 91—347 |
| 2,584,229 | 2/1952 | Sacchini | 91—347 |
| 3,064,628 | 11/1962 | Canalizo et al. | 91—347 |

FOREIGN PATENTS

| 690,621 | 4/1953 | Great Britain. |

PAUL E. MASLOUSKY, *Primary Examiner.*

U.S. Cl. X.R.

92—85, 94